United States Patent [19]

Bauer et al.

[11] Patent Number: 4,728,084
[45] Date of Patent: Mar. 1, 1988

[54] ADJUSTABLE-LENGTH GAS SPRING

[75] Inventors: Hans-Peter Bauer; Hans J. Bauer; Ludwig Stadelmann, all of Altdorf, Fed. Rep. of Germany

[73] Assignee: Fritz Bauer and Söhne oHG, Altdorf, Fed. Rep. of Germany

[21] Appl. No.: 896,179

[22] Filed: Aug. 12, 1986

[30] Foreign Application Priority Data

Aug. 31, 1985 [DE] Fed. Rep. of Germany ... 8524995[U]

[51] Int. Cl.$^4$ ............................................. F16F 5/00
[52] U.S. Cl. ................................ 267/64.11; 188/315; 188/322.17; 267/129
[58] Field of Search ................................ 267/64.11, 129; 188/322.17, 322.16, 315

[56] References Cited

U.S. PATENT DOCUMENTS

| | | |
|---|---|---|
| 2,040,063 | 5/1936 | Padgett ............................ 188/315 |
| 3,628,637 | 12/1971 | Axthammer ...................... 188/300 |
| 3,656,593 | 4/1972 | Bauer . | |
| 4,093,196 | 6/1978 | Bauer ........................... 188/300 X |
| 4,342,448 | 8/1982 | Wallis ...................... 188/322.17 X |
| 4,386,766 | 6/1983 | Bauer et al. ................... 188/300 X |
| 4,482,036 | 11/1984 | Wossner et al. ............... 188/322.17 |
| 4,519,481 | 5/1985 | Nicholls ....................... 188/322.17 |

FOREIGN PATENT DOCUMENTS 2122966 11/1972 Fed. Rep. of Germany ....................... 188/322.17

Primary Examiner—Joseph Falk
Attorney, Agent, or Firm—Browdy and Neimark

[57] ABSTRACT

An adjustable-length gas spring has two compressed-gas-filled cylinders concentrically surrounding one another, with a piston and piston rod disposed in the inner cylinder thereof. A valve for effecting communication between housing chambers divided by the piston is provided at one end of the cylinders. This valve has a valve body, which is sealed with respect to the cylinders by means of outer ring seals. In order to avoid the danger that the gas spring may become useless from damage to one of the outer ring seals, it is provided that the valve body embodied as an injection-molded plastic part tapers—optionally in gradations—towards its axial ends, without radial protrusions, beginning at a region between the two outer grooves, that the outer groove associated with the inner cylinder is axially defined with respect to the adjoining housing chamber by the cap which is directly connected to the valve body and that the outer groove associated with the inner wall of the outer cylinder is defined axially with respect to the outside of the gas spring by a separate ring that is firmly joined to the valve body.

12 Claims, 3 Drawing Figures

ADJUSTABLE-LENGTH GAS SPRING

FIELD OF THE INVENTION

The invention relates to an adjustable-length gas spring as generically defined hereinafter.

BACKGROUND OF THE INVENTION

Gas springs of this type are known from German Pat. No. 18 12 282, for example, which corresponds to U.S. Pat. No. 3,656,593. Because of their advantageous features, these gas springs have proved to be extraordinarily useful in practice, in particular as adjustable-length lifting devices in chair seat support shafts and the like. The valve bodies are fabricated as turned metal parts; that is, the outer grooves for receiving the outer ring seals are produced by recessing feeding, or infeeding. In this turning process, chips can become stuck in the outer groove, and it may not be possible to remove them by subsequent rinsing. Such chips may under some circumstances then remain in the outer groove, causing damage to the outer ring seal during the use of the gas spring, with the result that the gas spring becomes useless.

SUMMARY OF THE INVENTION

It is accordingly the object of the present invention to embody an adjustable-length gas spring of the above generic type in such a way that the danger that the gas spring will become useless due to damage to one of the outer ring seals is avoided.

This object is attained in accordance with the invention as defined hereinafter. Because of the shaping of the valve body, it is possible for it to be embodied as an injection-molded plastic part, no longer requiring any partition of the injection mold in an axial plane. Instead, the partition of the injection mold can be in a cross-sectional plane, in the region between the two outer grooves. Unmolding can be accomplished by pulling the mold halves apart in the axial direction. This assures that the bottom made during the injection, and the side walls, facing one another, of the outer grooves can be produced such that they are entirely free of burrs. A further feature of the invention assures that the cap, extending over a complete circumference of 360 degrees, on one side and the corresponding ring on the other form the respective missing side wall of the corresponding outer groove. Because there is a direct connection between the cap and the valve body at this location, reliable sealing is effected, and it is assured that the inner ring seal associated with the adjoining housing chamber also performs sure sealing between the valve body and the cap and valve pin. Embodying the valve body as an injection-molded plastic part reduces its weight, which also improves the usage characteristics. The embodiment according to the invention also effects a simplification of manufacture and hence lowers the production cost.

A further advantage of the invention is a further reduction in weight, with the above-mentioned improvement in usage characteristics, enabling a particularly reliable and firm, and hence operationally secure, connection between the cap and the valve body.

The guidance characteristics, that is, in particular the guidance length for the valve pin, are more favorable in a further feature of the invention, by which operational security is again improved, and hence the usage characteristics of the gas spring as well. If a further feature of the invention is put to use, then a further overall weight reduction of the gas spring is achieved, as well as a reduction in friction between the valve pin and the valve body, which facilitates actuation of the valve. The danger of cold corrosion between the valve pin and the valve body together with the ring and the cap, which would present itself in principle if the valve body were of metal and especially of aluminum, is also precluded.

An advantageous and satisfactory connection between the ring and the valve body is also disclosed.

Further advantages and characteristics of the invention will become apparent from the ensuing detailed description of an exemplary embodiment, taken in conjunction with the drawings.

DESCRIPTION OF THE PREFERRED EMBODIMENT

Figure 1:
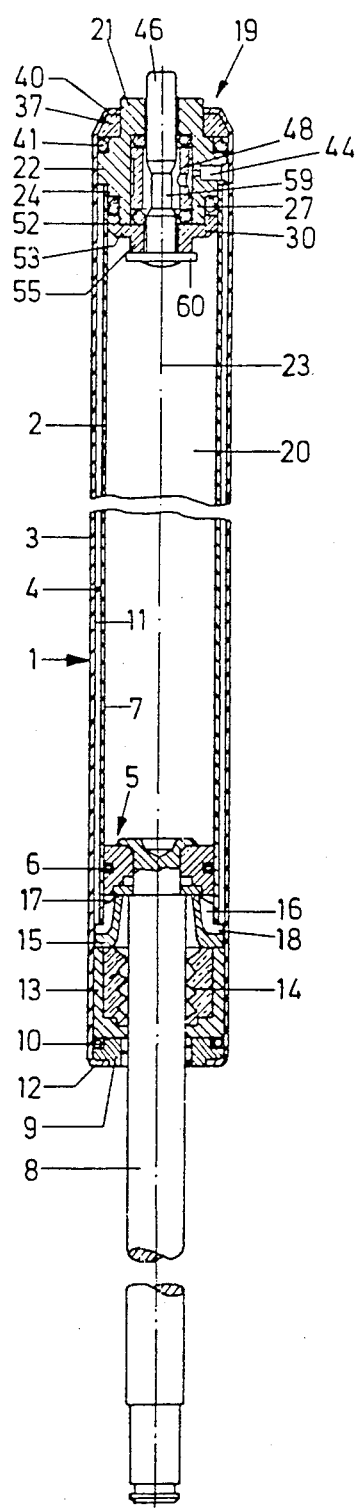
FIG. 1 is a longitudinal section taken through an adjustable-length gas spring according to the invention.

The adjustable-length gas spring shown in FIG. 1 has a housing 1, which substantially comprises two tubes of different diameters, supported concentrically one inside the other, namely an inner cylinder 2 and an outer cylinder 3. Because of the differing diameter of the inner cylinder 2 and the outer cylinder 3, an annular chamber 4 is formed between the outer cylinder 3 and the inner cylinder 2.

An approximately annular piston 5 is axially displaceable in the inner cylinder 2 and is sealed in a gas-tight manner, with its outer circumference, with respect to the inner wall 7 of the inner cylinder 2. The piston 5 is secured at one end of a piston rod 8 that is guided coaxially with the housing 1. This piston rod 8 is extended out of one end of the housing 1. At this end, the housing 1 is closed off by a closure disk 9, which is sealed in a gas-tight manner with respect to the inner wall 11 of the outer cylinder 3 by means of a ring seal 10. The closure disk 9 is axially outwardly retained by a flanged-over portion 12 of the outer cylinder 3. On the inside, a cup-shaped sleeve 13 rests against the closure disk 9, receiving a multiple lip seal 14 which with its lips rests sealingly against the piston rod 8. This prevents an escape of gas to the outside along the surface of the piston rod 8.

A centering piece 15 is supported from the direction of the interior chamber against the sleeve 13, resting on the inner wall 11 of the outer cylinder 3; the centering piece 15 is provided with ribs 16, on which the inner cylinder 2 is radially supported, and hence centered, with its inner wall 7. The inner cylinder 2 is also firmly supported axially on this ribs 16, thus being axially fixed at one end. Because only ribs 16 are provided for the centering and axial support of the inner cylinder 2, the annular chamber 4 communicates in this region with a housing chamber 17 in the inner cylinder 2. This housing chamber 17 is defined between the piston 5, the end of the housing 1 where the piston rod emerges, and the inner wall 7 of the inner cylinder 2. Overflow conduits 18 are thus formed between the ribs 16, between the housing chamber 17 and the annular chamber 4.

Figure 2:
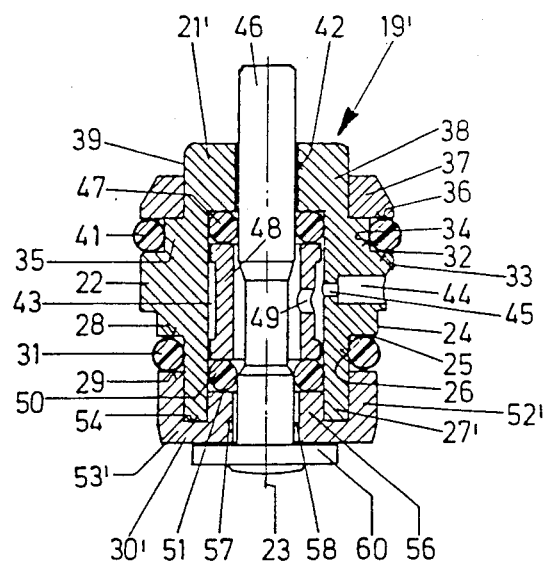
FIG. 2 shows a slightly modified embodiment of the valve of a gas spring according to the invention, in a longitudinal section on a larger scale.

A valve 19 is disposed at the end of the housing 1 opposite where the piston rod emerges; by means of this valve, the housing chamber 20 located in the inner cylinder 2 between the piston 5 and the valve 19 can be made to communicate with the annular chamber 4 and thus with the other housing chamber 17, or to be disconnected therefrom. Since the valve 19 shown in FIG. 1 and the valve 19' shown in FIG. 2 are predominantly identical, they will be described together below, while elements which are not identical merely in structural terms will be identified by the same reference numeral provided with a prime.

The valves 19 or 19' have a valve body 21, 21', which is respectively provided in its axially middle region with an annular collar 22, which rests on the inner wall 11 of the outer cylinder 3, thereby centering the valve body 21 or 21' in the outer cylinder 3. This annular collar 22 is the section of the largest diameter in the entire valve body 21 or 21' and is located approximately in the axially middle region. As used herein, the term "axial" always relates to the central longitudinal axis 23 of the gas spring, which at the same time is also the axis of symmetry of all the individual elements and component groups.

Toward the housing chamber 10, the annular collar 22 is adjoined by a centering collar 24 of lesser diameter, which rests on the inner wall 7 of the inner cylinder 2, thereby centering the inner cylinder 2 relative to the outer cylinder 3. At the same time, the inner cylinder 2 rests with its associated edge against the side face oriented toward it of the annular collar 22 and is thereby axially retained.

The centering collar 24 in turn is adjoined, in the direction toward the housing chamber 20, by an outer groove 25, the bottom 26 of which is embodied by a sleeve-like section 27 or 27' of the valve body 21 or 21', the outer diameter of which is in turn less than the outer diameter of the centering collar 24. One side wall 28, oriented toward the annular collar 22, of the outer groove 25 is embodied by the corresponding side face of the centering collar 24 at the transition of this collar to the section 27 or 27'. The other side wall 29, oriented toward the housing chamber 20, of the outer groove 25 is embodied by a cap 30 or 30'. An outer ring seal 31 is located in the outer groove 25, resting sealingly against the inner wall 7 of the inner cylinder 2, so that the escape of gas by a short cut from the housing chamber 20 to the annular chamber 4 and thus to the other housing chamber 17 is precluded there.

Viewed axially toward the outside of the housing 1, the annular collar 22 is adjoined by an outer groove 32, one side wall 33 of which, oriented toward the other outer groove 25, is embodied by the corresponding side face of the annular collar 22. Its bottom 34 is embodied by an annular section 35, which adjoins the annular collar 22, and the outer diameter of the annular section 35 is smaller than that of the annular collar 22. The side wall 36 of the outer groove 32 located toward the outside of the housing 2 is embodied by a ring 37. This ring 37 is disposed on a cylindrical guide section 38, the outer diameter of which is once again less than that of the annular section 35, and which extends outside the housing 1 of the gas spring. The ring 37 is fixed with a press fit on the cylindrical outer face 39 of the guide section 38. As may be seen from FIG. 1, the outer edge of the outer cylinder 3 is pressed with a flanged-over portion 40 around the outside of the ring 37, thereby effecting the retention of the entire valve 19, 19' with respect to the outside and at the same time axially pressing it inward against the inner cylinder 2.

The valve body 21 or 21' comprising the guide section 38, the annular section 35, the annular collar 22, the centering collar 24 and the sleeve-like section 27 or 27' is molded in one piece from plastic and—as the foregoing description makes apparent—is designed symmetrically with respect to the central longitudinal axis 23, so that it can be injected with one mold which is partitioned only in a plane located transversely to the axis 23, which plane is in turn located in the vicinity of the annular collar 22. From here on, the valve body 21 or 21' tapers axially toward each of its ends, in gradations. The ring 37 is also made of plastic. In the outer groove 32, there is an outer ring seal 41, which rests against the inner wall 11 of the outer cylinder 3 and thus prevents an escape of gas to the outside in this vicinity.

The valve body 21 or 21' is provided in the vicinity of its guide section 38 with a cylindrical coaxial guide bore 42, which is adjoined, up to the housing chamber 20, by a likewise cylindrical interior valve body chamber 43, which thus extends axially across the region from the annular section 35 as far as the sleeve-like section 27 or 27'. This interior chamber 43 has a larger diameter than the guide bore 42. Thus the manufacture of the valve body 21, 21' presents no problems with respect to the interior region either, since a core can be used for the interior chamber 43 and the adjoining guide bore 42.

Discharging into this interior chamber 43 is an overflow conduit 44 that radially penetrates the annular collar 22 and on its outside discharges into the annular chamber 4. At the exit into the interior chamber 43, the overflow conduit 44 is provided with a throttle opening 45.

A valve pin 46 is disposed in the valve body 21 or 21', protruding to the outside out of the guide section 38 and thus out of the gas spring. This substantially cylindrical valve pin 46 is guided in the guide bore 42. At the transition from the guide bore 42 to the interior 43, an inner ring seal 47 is provided, which is axially fixed with respect to the outside by means of the transition between the interior chamber 43 and the guide bore 42 and which rests radially on the valve pin 46 on one side and on the wall of the interior chamber 43 on the other, thereby precluding the escape of gas through the guide bore 42. The inner ring seal 47 is axially fixed in the direction toward the housing chamber 20 by a spacer sleeve 48, which is provided with one or more through openings 49, so that the gas is also capable of entering the spacer sleeve 48.

An inner ring seal 50 also rests on the end of the spacer sleeve 48 oriented toward the housing chamber 20, resting radially against the inner wall of the interior chamber 43 and against the valve pin 46. Axially in the direction toward the housing chamber 20, the inner ring seal 50 rests against a corresponding bearing face 51 of the cap 30 or 30'.

In the embodiment according to FIG. 1, the cap 30 is cup-shaped; that is, it has an outer annular protrusion 52, extending axially toward the outside of the gas spring and on which the side wall 29 of the outer groove 25 is embodied. The lid 30 also has a section 53 in the shape of an annular disk, which is joined to the face end 54 of the sleeve-like section 27 facing the housing chamber 20 by welding or gluing and in particular by ultrasonic sealing. Since the cap 30 or 30' is also made of plastic, this is readily accomplished. The inner ring seal 50 rests on the annular-disk-like section 53, radially inside the face end 54.

A short annular-cylindrical spacer protrusion 55 also extends into the housing chamber 20 from the annular-disk-like section 53.

In the embodiment of FIG. 2, the cap 30' likewise has an outer annular protrusion 52', embodied with a somewhat greater axial length, and an annular-disk-like section 53' which is joined to the face end 54 of the sleeve-like section 27' in the same manner as described above. Radially inward, an annular-cylindrical protrusion 56 extends axially outward from this annular-disk-like section 53', and the inner ring seal 50 rests against this protrusion 56.

The cap 30 or 30' has a coaxial bore 57, the diameter of which is somewhat greater than the diameter of the valve pin 46 in this region, thereby forming an annular through conduit 58.

In the position of repose of the valve pin 46 shown in the drawing figures, in which the valves 19, 19' are closed, there is a restriction 59 of the valve pin 46, between the inner ring seals 47 and 50; that is, the housing chamber 20 is divided from the annular chamber 4, and hence from the housing chamber 17, in a gas-tight manner. If the valve pin 46 is pushed into the valve body 21, 21', the restriction 59 spans the inner ring seal 50 oriented toward the housing chamber 20, so that gas can flow from the housing chamber 17 through the annular chamber 4, the interior valve body chamber 43 and the through conduit 58 into the housing chamber 20, and vice versa.

On its end located in the housing chamber 20, the valve pin 46 has a stop plate 60, so that it cannot be pushed to the outside by the gas pressure. The basic mode of operation of this adjustable-length gas spring is otherwise generally familiar, for instance from German Pat. No. 18 12 282, corresponding to U.S. Pat. No. 3,656,593. The spacer sleeve 48 is made of plastic also.

Figure 3:
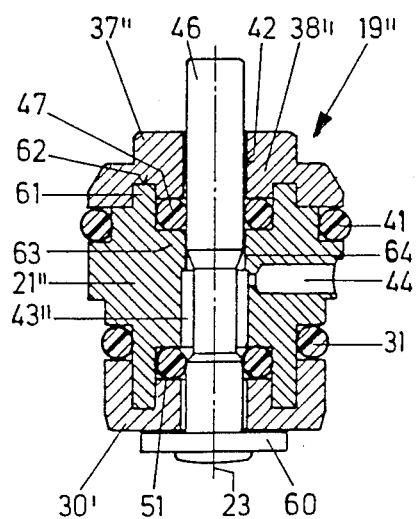
FIG. 3 shows a further embodiment of a valve of the gas spring according to the invention, in longitudinal section.

The valve 19" shown in FIG. 3 is similar in many respects to the valve 19 or 19', so that it need not be described again. The important reference numerals used in FIGS. 1 and/or 2 are used again in FIG. 3. Only those aspects differing from the foregoing description will be described below. Elements having the same function but a different structure are identified by a reference numeral provided with a double prime.

The ring 37" in the valve 19" is larger in size; that is, it also includes the guide section 38" and the guide bore 42, so that the inner ring seal 47 defining the interior valve chamber 43" with respect to the outside also rests against the ring 37". A coaxially extending annular centering protrusion 61 is embodied on the valve body 21", engaging a corresponding annular centering groove 62 in the ring 37"; as a result, the ring 37" and the valve body 21" are joined together such that they are exactly in alignment with one another and are concentric with respect to the axis 23. The outer inner ring seal 47 can thus be introduced prior to the placement of the ring 37" upon the valve body 21"; that is, a spacer sleeve embodied as a separate part is not required. Instead, the inner ring seal 47 rests against a region 63 embodied integrally with the valve body 21" and also having a supplementary guide bore 64. This region 63 having the supplementary guide bore 64 extends as far as the interior valve body chamber 43" (which is smaller in size as compared with the embodiment of FIGS. 1 and 2). Thus the entire guide length for the valve pin 46, and hence the danger of canting or tilting and the like, is reduced. The ring 37" is again made of plastic.

Polyamides are particularly suitable as examples of plastics for the valve bodies 21, 21', 21"; the caps 30, 30'; and the rings 37, 37".

The valve body 21" according to FIG. 3 can be produced in an injection mold as well, the molding partitioned only transversely to the longitudinal axis 23 in the vicinity of the annular collar 22 and having a core that forms the interior chamber 43" and the guide bore 42. In no instance are there any resultant burrs in the vicinity of the outer grooves.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:
1. An adjustable-length gas spring comprising:
an inner cylinder and an outer cylinder concentrically disposed with a common axis and having first and second ends, said cylinders defining an annular chamber between them and being at least partially filled with a compressed gas, and means for holding said cylinders in a concentric relationship;
a piston arranged to slide in the inner cylinder, said piston including an seal and means for retaining said seal against the inner wall of the inner cylinder;
said piston being connected to a piston rod extending to the outside through said first end of said inner cylinder, and a seal and means for mounting said seal at said first end of said inner cylinder so that said piston rod is sealed with respect to said first end of said inner cylinder, and said piston dividing the interior of the inner cylinder into a first housing chamber adjacent said first end and a second housing chamber adjacent said second end, said gas spring having an overflow conduit effecting communication between the annular chamber and said first housing chamber in the vicinity of where the piston rod emerges;
said gas spring having a valve closing off the cylinders from the outside at said second end and joining said annular chamber to said second housing chamber;
said valve having a valve body provided with a first outer ring seal disposed in a first outer groove and resting on the inner wall of said inner cylinder, and at least one second outer ring seal disposed in a second outer groove and resting on said inner wall of said outer cylinder;
an interior valve body chamber communicating with said annular chamber formed in said valve body and axially penetrated by a valve pin;
said interior valve body chamber being sealed with respect to the outside by a first inner ring seal and means for retaining said inner ring seal on said valve pin and sealed with respect to said second housing chamber by a second inner ring seal and means for disposing said second inner ring seal spaced apart from the first inner ring seal and against the valve pin;

a cap at said second end comprising supporting structure for said second inner ring seal in the direction of said second housing chamber and comprising a part of said means for disposing said second ring seal against the valve pin, said cap further comprising supporting structure for said first outer ring seal in the direction of said second housing chamber and defining with said valve body said first outer groove within which is disposed said first outer ring seal;

said cap being undetachably joined to said valve body;

said valve body comprising injection-molded plastic and tapering towards its axial ends without radial protrusions; and a separate ring firmly joined to said valve body and defining therebetween said second outer groove within which is disposed said second outer ring seal.

2. The gas spring of claim 1 wherein the cap is made of plastic.

3. The gas spring of claim 1 wherein the cap is joined to the valve body in the region between the inner ring seal and the outer groove by means of welding.

4. The gas spring of claim 1 wherein the cap is joined to the outer valve body in the region between the inner ring seal and the outer groove by means of gluing.

5. The gas spring of claim 1 wherein the ring serves as a bearing surface for the inner ring seal, effecting sealing in the outward direction.

6. The gas spring of claim 1 wherein the ring is made of plastic.

7. The gas spring of claim 1 wherein the ring is joined to the valve body by a press fit.

8. An adjustable-length gas spring comprising:

an inner cylinder and a concentrically disposed outer cylinder with an annular chamber therebetween and having first and second closed ends;

a piston slidable within said inner cylinder separating said inner cylinder into a first housing chamber adjacent said first end and a second housing chamber adjacent said second end;

a piston rod connected to said piston and projecting through said first closed end, a seal slidably surrounding said piston rod at said first closed end, and means for retaining said seal at said first closed end;

an injection-molded plastic valve body closing said second closed end and holding said cylinders in concentric relationship, said valve body being tapered on its outer surface in a step-wise fashion towards its axial ends to provide at least three exterior diameters without radial protrusions, said valve body defining a passageway joining said annular chamber to said second housing chamber;

an axially extending interior valve body chamber forming part of said passageway and axially penetrated by a valve pin;

first and second inner ring seals surrounding and sealing said valve pin, and means supporting said first and second inner ring seals within said valve body;

a first outer ring seal supported in a first outer groove against the inner wall of said inner cylinder, and a cap connected to said valve body adjacent said second housing chamber so as to define said first outer groove between a step of said valve body and said cap; and a second outer ring seal supported in a second outer groove against the inner wall of said outer cylinder, and a separate ring firmly joined to said valve body so as to define said second outer groove between a step of said valve body and said separate ring.

9. An adjustable-length gas spring in accordance with claim 8 wherein said means supporting said second inner ring seal within said valve body comprises an annular axially directed portion of said cap.

10. An adjustable-length gas spring according to claim 9 wherein said separate ring comprises a second cap, said means supporting said first inner ring seal comprising an annular axially extending portion of said second cap.

11. An adjustable-length gas spring according to claim 10 wherein said valve body is tapered on its inner surface in a step-wise fashion to define a part of said passageway, an internal step of said valve body cooperating with said annular axially directed portion of said first mentioned cap to define therebetween said means for supporting said first inner ring seal, and a second internal step of said valve body cooperating with said annular axially extending portion of said second cap to define therebetween said means for supporting said second inner ring seal.

12. An adjustable-length gas spring according to claim 8 wherein said separate ring comprises a second cap, said means supporting said first inner ring seal comprising an annular axially extending portion of said second cap.

* * * * *